United States Patent
Hernacki et al.

(10) Patent No.: US 8,069,486 B1
(45) Date of Patent: Nov. 29, 2011

(54) IDENTIFYING THE ORIGIN OF HARD-COPY DOCUMENTS

(75) Inventors: Brian Hernacki, San Carlos, CA (US); Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 1080 days.

(21) Appl. No.: 11/391,610

(22) Filed: Mar. 27, 2006

(51) Int. Cl.
*G06F 12/16* (2006.01)
(52) U.S. Cl. ............ 726/26; 726/22; 726/28; 726/23
(58) Field of Classification Search ............ 380/200, 380/30; 713/192, 168, 182; 726/4, 13, 30, 726/24; 709/12, 14
See application file for complete search history.

(56) References Cited

U.S. PATENT DOCUMENTS

| 7,328,245 | B1 * | 2/2008 | Hull et al. ............ 709/206 |
| 7,337,472 | B2 * | 2/2008 | Olsen et al. ............ 726/26 |
| 7,434,048 | B1 * | 10/2008 | Shapiro et al. ............ 713/165 |
| 7,512,979 | B1 * | 3/2009 | Koike et al. ............ 726/23 |
| 2003/0009672 | A1 * | 1/2003 | Goodman ............ 713/176 |
| 2005/0188084 | A1 * | 8/2005 | Tokishige et al. ............ 709/224 |

* cited by examiner

*Primary Examiner* — Vivek Srivastava
*Assistant Examiner* — Nega Woldemariam
(74) *Attorney, Agent, or Firm* — Wilmer Cutler Pickering Hale and Dorr LLP

(57) ABSTRACT

Capturing information associated with a document is disclosed. An indication that a request to print a document is being transmitted is observed in network traffic associated with a printer. At a node other than the printer, data associated with the observed network traffic is processed to determine information associated with the request to print the document.

17 Claims, 4 Drawing Sheets

IDENTIFYING THE ORIGIN OF HARD-COPY DOCUMENTS

BACKGROUND OF THE INVENTION

"Data extrusion" is the general problem in which information is leaked (without authorization), for example by a disgruntled employee, from an organization. A leaked memo, financial forecast, product plan, or technical design could potentially cost a company millions of dollars. Increasingly, security tools such as firewalls and cryptography are configured and used to help prevent electronic data from reaching unauthorized parties. Techniques such as digital watermarking are also employed to help identify the source of information leaked in electronic form.

Unfortunately, these approaches do nothing to mitigate a classic data extrusion technique—printing hardcopies of sensitive information and physically conveying them to an unauthorized party. With little effort, a rogue employee can print memos, schedules, design documents, etc., and slip them into a bag or briefcase without detection. Even if some physical security—such as an exit search—is applied to employees, it is infeasible to evaluate each document carried outside of a typical office building. Moreover, it can be difficult for security personnel to recognize the importance of a particular document. For example, confidential financial data may look comparable to public accounting details.

Therefore, it would be desirable to have a better way to track a printed document to the individual that printed it. It would also be desirable to accomplish such tracking without requiring many, if any, changes to an existing installed base of printers.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Using stored print audit trail information to identify the origin of a hard copy document is disclosed. Network traffic to a printer is monitored and audit trail data stored for at least a subset of print jobs associated with a printer. Later, if a need or desire arises to determine what machine and/or user caused a particular hard copy document to be printed, data associated with and/or comprising the hard copy document is compared to the stored audit trail data. If a match is found, the associated stored audit trail data is used to determine a machine and/or user associated with the printing of the hard copy document.

Figure 1:
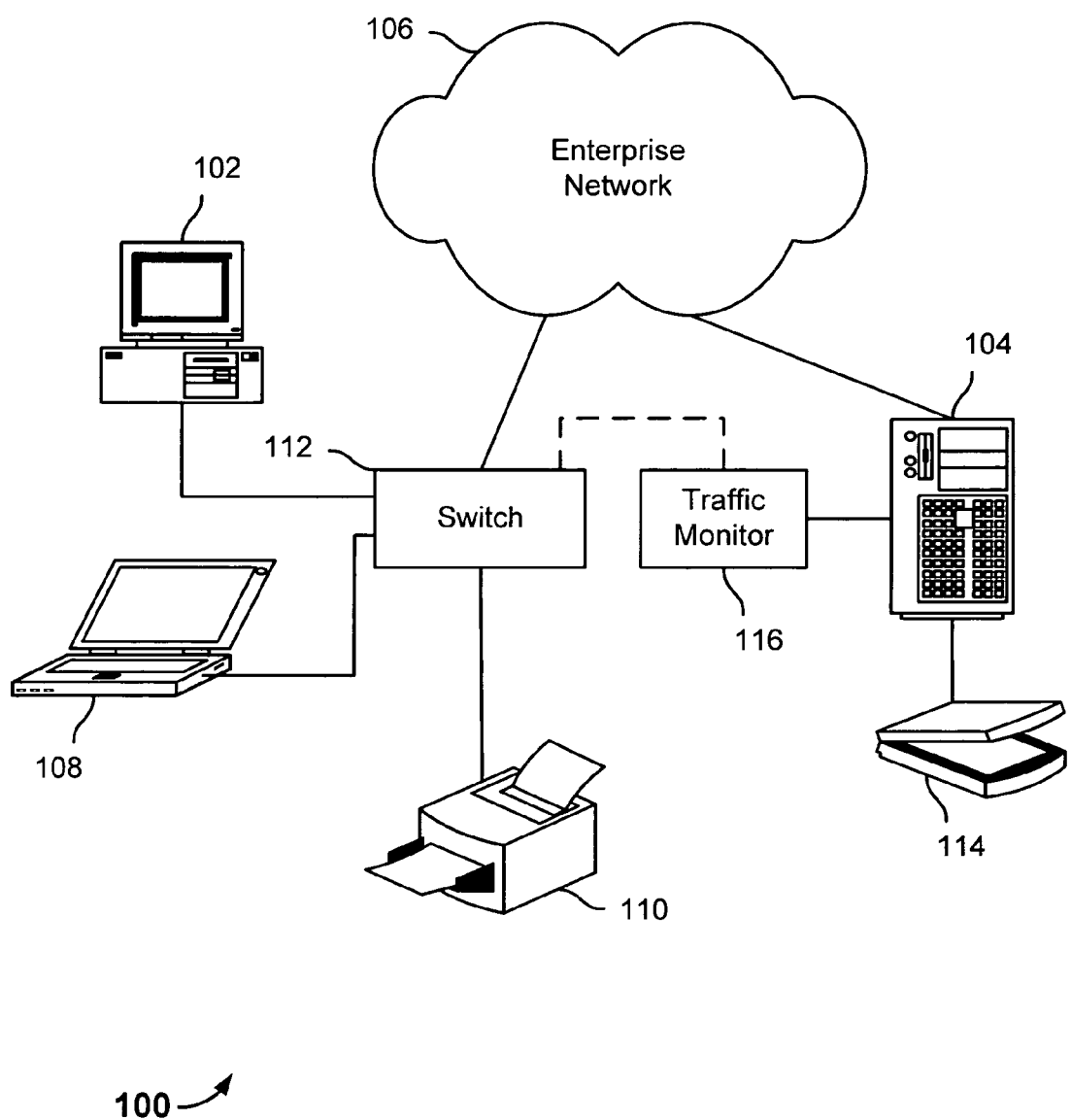
FIG. 1 is a diagram illustrating an embodiment of a system providing printout auditing.

FIG. 1 is a diagram illustrating an embodiment of a system providing printout auditing. System 100 includes at least one client 102, and other nodes, such as client 108, that are connected to a network, such as enterprise network 106. In the example shown, client 102 is an employee desktop, routinely used to edit and view memos, sales figures, and other documents. As used herein, documents include Web pages, text files, photographs, and any other content (whether stored in a proprietary format or not) that can be printed on a printer, plotter, all-in-one device, networked copier, etc. (hereinafter collectively referred to as "printers"). Client 102 may also be one of a variety of other devices, such as a workstation, tablet, PDA, or other computing platform, as applicable.

In the example shown, printer 110 is a networked printer, connected to the same switch (112) as clients 102 and 108. Printers may be connected into network 106 in a variety of ways. For example, client 102 may print to a printer located on a different switch in network 106 (not shown). Client 102 may also print to shared printers attached to other nodes, such as a printer attached via USB to a node that routes print requests for it (not shown).

Suppose the employee sends a print job (e.g., the document "new_product_line.doc") to printer 110. As explained in more detail below, in some embodiments, a traffic monitor 116 observes the print request and stores a representation of the document being printed, as well meta information about the print job, on server 104.

In some embodiments, monitoring is implemented in switch 112 or printer 110 and traffic monitor 116 is omitted. In some cases, the functionality of traffic monitor 116 and server 104 are combined in a single device, and may perform additional tasks such as intrusion detection. In the example shown, traffic monitor 116 has a direct connection to server 104, but in other embodiments, traffic monitor 116 and server 104 do not have a direct connection and instead communicate via enterprise network 106. In some cases, server 104 and/or scanner 114 are located outside enterprise network 106. Such may be the case if document auditing services are provided by a third party.

Suppose that a printed copy of new_product_line.doc winds up somewhere it ought not to be—posted to a bulletin board, or reprinted in a newspaper. As described in more detail below, an administrator can scan the printout, such as with scanner 114, and consult the data stored on server 104 to determine who printed the document. In the event that multiple people have printed new_product_line.doc, the information stored on server 104 can be used to help narrow down who might be responsible for the printout by providing details such as when the respective print jobs were sent, how many copies were made, etc. In some embodiments, data stored on server 104 is correlated with other information, if available, such as a date/timestamp on the printout, suspected timeframe of disclosure as indicated by data from other sources, etc., to more precisely determine the source.

Figure 2:
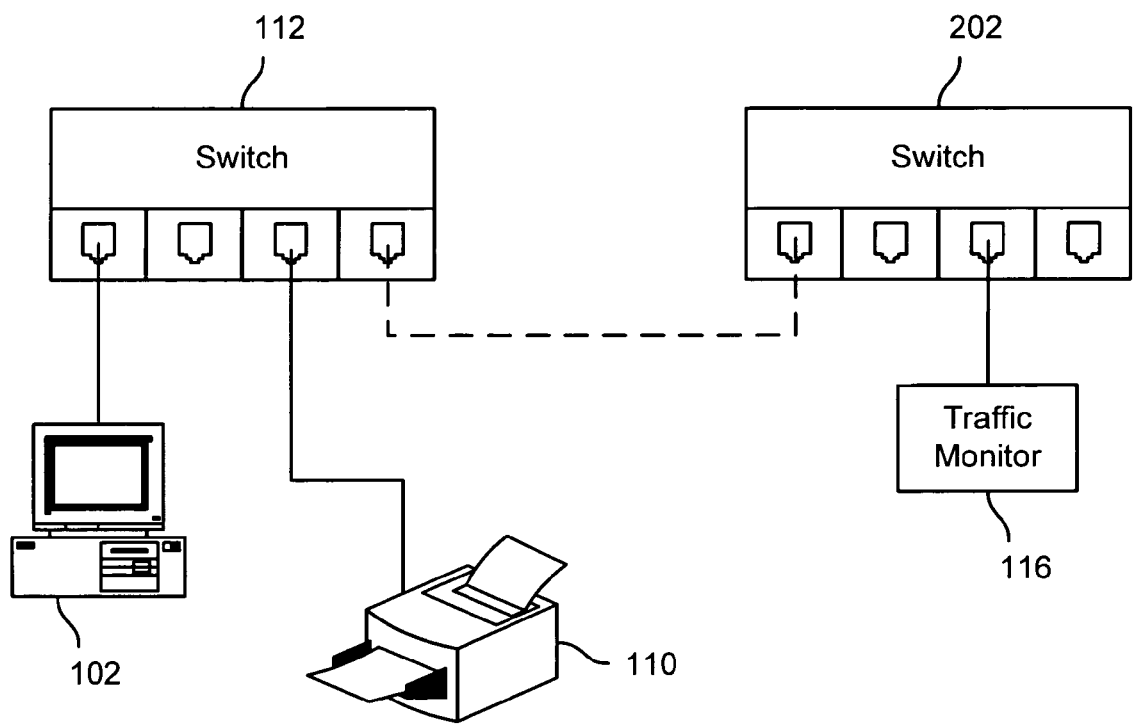
FIG. 2 is a diagram illustrating a portion of a system providing printout auditing.

FIG. 2 is a diagram illustrating a portion of a system providing printout auditing. In the example shown, switches 112 and 202 implement a remote switched port analyzer (RSPAN) feature. RSPAN uses reflector ports to enable the reproduction of traffic on a source port residing on a first switch to a destination port residing on a second switch. Thus, in the example shown, traffic associated with printer 110 is copied from switch 112 to switch 202 where it can be made available to traffic monitor 116. In some embodiments, traffic monitor 116 resides on the same switch as printer 110. In such a case, rather than using RSPAN, a typical switched port analyzer (SPAN) feature built into switch 112 is used to copy traffic destined for printer 110 to traffic monitor 116.

Passive monitoring from the vantage point of a node such as switch 112 and/or monitor 116 enables print traffic to be detected without requiring that an agent be installed and properly configured on client 102 or embedded in printer 110 to provide printout tracking. Not requiring such an agent and/or embedded logic enables print traffic monitoring to be performed with respect to any client and printer on the network. It also permits the observation of traffic sent via switch 112 through unmanaged channels (e.g. not through the domain print server). In some embodiments, switch 112 and/or traffic monitor 116 are configured to detect shared printers that are attached (e.g., via USB) to nodes, rather than being attached directly to switch 112, and monitor connections to those nodes for indications of printer traffic (e.g., common printer protocols).

Figure 3:
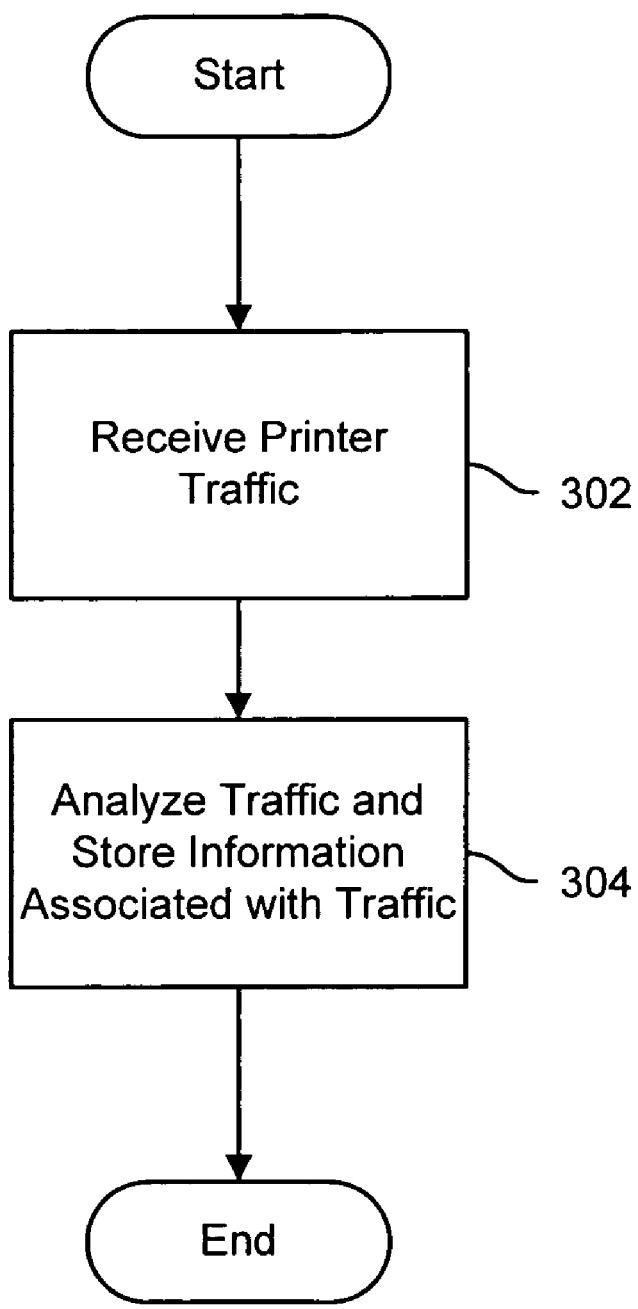
FIG. 3 is a flow chart illustrating an embodiment of a process for capturing print traffic.

FIG. 3 is a flow chart illustrating an embodiment of a process for capturing print traffic. In some embodiments, the process of FIG. 3 is implemented by traffic monitor 116 and server 104.

At 302, printer traffic is received. For example, at 302, traffic monitor 116 receives a copy of traffic sent by client 102 to printer 110. The protocols used by printers are generally well known and well documented. A parser on monitor 116 is configured to decode traffic to the printer and reassemble the document sent by client 102 to be printed.

At 304, the printer traffic is analyzed and information associated with the traffic is stored. The information associated with the printer traffic is sometimes referred to herein as "print audit trail information" and includes any information usable to match a hardcopy document (word processing document, photograph, etc.) with a print job by which the document was printed. In some embodiments, one or more "fingerprints" of the document are generated based on characteristics on the document, and can be used to match a hardcopy to its origin. For each document sent to printer 110, a variety of information may be captured, ranging from an exact copy (e.g., storing a PostScript™ or PDF copy) with extensive statistical information, to a simple hash of the document's contents. In addition, meta-information about the printing circumstances (client 102's IP address, the date and time, etc.) can be captured and stored along with the document and its fingerprint. In some embodiments, one or more thumbnail images of the document are also created and stored. As described in more detail below, such thumbnails can be used as a quick way for a human to determine which documents are stored on server 104.

In some embodiments, analysis and storage options are configurable by an administrator based on the types of documents that are expected to be printed in enterprise network 106 and the amount of and types of resources that are available for printout tracking. For example, in an environment with high security needs (e.g., a research and design facility), traffic monitor 116 may be configured to capture and permanently store an exact copy of the document being printed in an image file. In the marketing department of a typical corporation, less information may be stored, or may be stored for a limited amount of time to help manage resources.

What is computed (and stored) can be configured in some embodiments to depend on a variety factors. One such factor is origin (who is printing). For example, all printouts made by personnel working in the finance department may be captured in full by traffic monitor 116, while the printouts made by cafeteria staff (who do not have read access to sensitive files) may not be captured at all, or may be otherwise treated differently by traffic monitor 116. Another factor is destination (to which printer is the document being sent). All documents sent to a high resolution plotter (used generally for blueprints) may be permanently archived, while documents sent to a line printer (incapable of printing images) may be exempted from monitoring.

Factors can also include the particular type of document being printed, and/or its contents. For example, traffic monitor 116 can be configured to store exact copies of images (photographs) that are printed, but store only the plaintext (without any formatting) of Word documents. Similarly, traffic monitor 116 can be configured to analyze the text of all documents being printed to printer 110 and keep full copies of any containing trigger words (such as "confidential" or "forecast"), while merely hashing other documents.

Fingerprints can be based on such qualities as the letter or significant word frequencies of the document, word density, document similarity scoring techniques, etc. If necessary, OCR can be performed on the data transmitted to the printer to help extract the plaintext of documents for analysis. If the entire document is stored, e.g., as an image, pieces of information necessary for later image similarity comparisons can also be extracted and stored as a "fingerprint."

Printer header information typically includes meta-information such as the origin of the print job (e.g., username and/or hostname), the name of the file, the destination (e.g., printer to which the document was sent), the time the request was sent, etc. In some embodiments, in addition to storing a representation of the document and/or its fingerprint in a searchable format, meta-information is stored. Information can also be gleaned independently by traffic monitor 116 from services such as DHCP and a network admission control (NAC) server (e.g. IP/user bindings), and stored as well. If printer 110 supports any type of trustable audit trail (e.g., tags or watermarks embedded in color printers to help trace/identify counterfeiters), this information can be correlated and stored with the other data.

Figure 4:
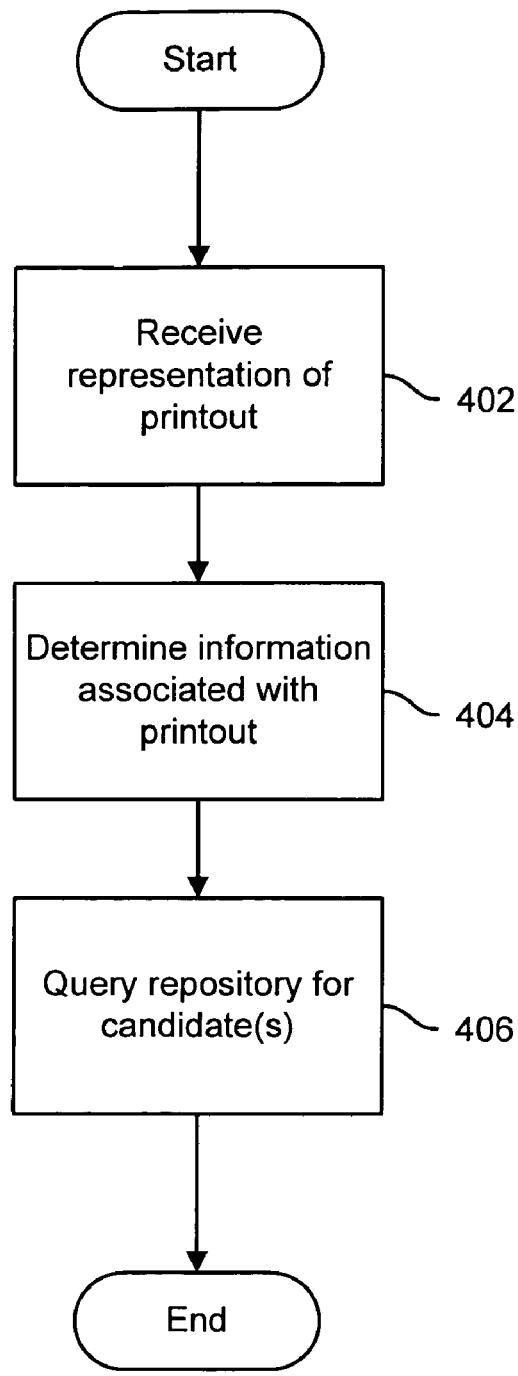
FIG. 4 is a flow chart illustrating an embodiment of a process for determining the source of a printout.

FIG. 4 is a flow chart illustrating an embodiment of a process for determining the source of a printout. In some embodiments, the process of FIG. 4 is implemented by scanner 114 and server 104.

When a hardcopy is discovered for which origin information is wanted, it is inputted into system 100 at 402 via scanner 114. The hardcopy may be anything originally printed by a printer such as printer 110. It may be, for example, a photograph, a text document, a plot, a blueprint, etc.

In the example shown in FIG. 1, scanner 114 is a desktop scanner attached to server 104 such by a USB connection. In other embodiments, scanner 114 is a networked scanner, a digital camera, a FAX machine, or any other input device which can capture an image of a hard copy. In some embodiments, rather than or in addition to scanner 114, document images may be inputted into server 104 directly as digital images, such as by submitting a TIF of the hard copy to server 104 via FTP or email. In some embodiments, scanner 114 is capable of detecting tags embedded by the printer (such as small dots or other tracing marks, imperceptible to the human eye, which encode meta-information about the printout and/or how/when/by whom it was generated it) which identify such information as the printer and time printed. Other circumstantial information which can help identify the source of the document (and constrain the search), such as if the document was discovered sitting unclaimed near a particular printer or location, and/or conclusions or manually entered search terms/constraints derived from such other information, in some embodiments can be inputted at 402 as well, as applicable.

At 404, information associated with the printout is determined. In some embodiments, this portion of the processing corresponds with the analysis performed at 304 in FIG. 3. Which processing is appropriate in some embodiments depends at least in part on which analysis was employed by the system at 304. Thus, as applicable, at 404 optical character recognition (OCR) is performed on the printout received at 402 and the resulting text evaluated, e.g., for word frequency, document similarity, etc., to derive a fingerprint of the printout. In some cases, intermediate data is calculated for scoring image similarity.

At 406, server 104 is queried for matches between the fingerprint of the hardcopy (determined at 404) and any stored documents (processed at 304). Any metadata known about the printout (approximate time it was obtained, location in which it was found, etc.) can be used to filter results, as can supplemental data such as watermark information embedded in the document.

In some cases, due to factors such as OCR errors, cropped margins, etc., an exact match between fingerprints may not be located. In some embodiments, likely matches (and any meta-information associated with the matches) are presented to an administrator, for example, by presenting all documents that exceed a threshold similarity to the fingerprint of the printout. In some embodiments, a viewing function allows an administrator to step through thumbnail images of the documents to help identify a match.

In some cases, the origin of a printout may be ambiguous. This could occur, for example, if a document was printed by multiple people and insufficient meta-information (e.g., time printed) is known about the hardcopy. In such a case, it is possible that two or more people could plausibly have printed the document. Nonetheless, if there are a thousand employees at the organization, being able to narrow the suspects down to a more manageable number represents a considerable time savings.

In some embodiments, matching is performed by a third party, or in a location physically separate from scanner 114. This may be the case, for example, if server 104 or its functionality is provided by a third party.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of capturing information associated with a document, comprising:
    observing, in network traffic between a source and a printer, an indication that a request to print a document is being transmitted from the source to the printer;
    processing, at a node other than the source and the printer, data associated with the observed network traffic to determine information associated with the request to print the document, including a representation of the document being transmitted from the source to the printer;
    storing the data associated with the observed network traffic, including the representation of the document being transmitted from the source to the printer, wherein the representation includes a unique fingerprint of the document being transmitted from the source to the printer; and
    receiving information associated with a hardcopy printout to determine, using the stored data, an origin of the printout.

2. The method of claim 1 wherein processing at least a portion of the network traffic to determine information associated with the request to print the document includes capturing meta-information.

3. The method of claim 1 further comprising storing in a body of print audit trail information at least a portion of the information associated with the request to print the document.

4. The method of claim 3 further comprising using at least a portion of the information associated with the printout to search at least a portion of the body of print audit trail information for a print job associated with the printout.

5. The method of claim 4 wherein the print job associated with the printout comprises a print job for which associated data comprising the body of print audit trail information satisfies a match criteria with respect to corresponding data associated with the printout.

6. The method of claim 4 wherein the print job associated with the printout comprises a first candidate print job included in a set of candidate print jobs, each member of which is associated with a respective data comprising the body of print audit trail information that satisfies a match criteria with respect corresponding data associated with the printout.

7. The method of claim 4 further comprising using an origin identifying datum included in the body of print audit trail information and associated with the print job to determine an origin of the printout.

8. The method of claim 7 wherein the origin identifying datum identifies one or more of the following: a user associated with the print job and a machine from which the print job originated.

9. The method of claim 4 wherein receiving information associated with the printout comprises receiving from one or more of the following a representation of the printout: a scanner, a digital camera, a FAX machine, and an image file.

10. The method of claim 4 wherein the information associated with the printout comprises one or more of the following: an image of the printout; a fingerprint of the printout; letter frequency information; word frequency information; and information usable to perform document similarity processing.

11. The method of claim 4 wherein the information associated with the printout is obtained at least in part by optical character recognition.

12. A method of determining an origin of a printout, comprising:
- receiving a printout hardcopy;
- processing the printout hardcopy to determine a fingerprint of the printout hardcopy, wherein the fingerprint includes at least one characteristic based on qualities of the printout hardcopy;
- storing the fingerprint; and
- using at least a portion of the fingerprint to search electronically at least a portion of a body of print audit trail information for a print job associated with the printout hardcopy.

13. A system for capturing information associated with a document, comprising:
- a processor, configured to:
  - observe, in network traffic between a source and a printer, an indication that a request to print a document is being transmitted from the source to the printer;
  - process, at a node other than the source and the printer, at least a portion of the network traffic to determine information associated with the request to print the document, including a representation of the document being transmitted from the source to the printer;
  - store the data associated with the observed network traffic, including the representation of the document being transmitted from the source to the printer, wherein the representation includes a unique fingerprint of the document being transmitted from the source to the printer; and
  - receive information associated with a hardcopy printout to determine, using the stored data, an origin of the printout; and
- a memory, coupled to the processor, configured to provide the processor with instructions.

14. The system of claim 13 wherein the processor is further configured to process at least a portion of the network traffic to determine information associated with the request to print the document at least in part by capturing meta-information.

15. The system of claim 13 wherein the processor is further configured to store in a body of print audit trail information at least a portion of the information associated with the request to print the document.

16. The system of claim 15 wherein the processor is further configured to receive information associated with a printout and use at least a portion of the information associated with the printout to search at least a portion of the body of print audit trail information for a print job associated with the printout.

17. A computer program product for capturing information associated with a document, the computer program product being embodied in a non-transitory computer readable storage medium and comprising computer instructions for:
- observing, in network traffic between a source and a printer, an indication that a request to print a document is being transmitted from the source to the printer;
- processing, at a node other than the source and the printer, at least a portion of the network traffic to determine information associated with the request to print the document, including a representation of the document being transmitted from the source to the printer; and
- storing the data associated with the observed network traffic, including the representation of the document being transmitted from the source to the printer, wherein the representation includes a unique fingerprint of the document being transmitted from the source to the printer; and
- receiving information associated with a hardcopy printout to determine, using the stored data, an origin of the printout.

\* \* \* \* \*